(12) United States Patent
Palese

(10) Patent No.: US 7,128,554 B2
(45) Date of Patent: Oct. 31, 2006

(54) APPARATUS FOR MAKING PATTIES

(76) Inventor: Jeffrey W. Palese, 5535 Birch St., North Ridgeville, OH (US) 44039

(*) Notice: Subject to any disclaimer, the term of this patent is extended or adjusted under 35 U.S.C. 154(b) by 481 days.

(21) Appl. No.: 10/458,159

(22) Filed: Jun. 9, 2003

(65) Prior Publication Data

US 2004/0247759 A1 Dec. 9, 2004

(51) Int. Cl.
*A22C 7/00* (2006.01)
(52) U.S. Cl. .................. 425/192 R; 425/572; 425/588; 426/513
(58) Field of Classification Search ............ 425/192 R, 425/326.1, 382 R, 572, 575, 588; 426/512, 426/513
See application file for complete search history.

(56) References Cited

U.S. PATENT DOCUMENTS

| | | | |
|---|---|---|---|
| 3,679,167 A | 7/1972 | Jupiter et al. | |
| 3,697,036 A | 10/1972 | Kanbar et al. | |
| 3,725,974 A | 4/1973 | Kuhlman | |
| 3,928,891 A | 12/1975 | Holly | |
| 3,934,308 A | 1/1976 | Neri | |
| 3,939,530 A | 2/1976 | Holly | |
| 3,939,531 A | 2/1976 | Holly | |
| 3,943,601 A | 3/1976 | Kuhlman | |
| 3,943,602 A | 3/1976 | Siclari | |
| 3,956,516 A | 5/1976 | Holt et al. | |
| 4,054,967 A | 10/1977 | Sandberg et al. | |
| 4,057,874 A | 11/1977 | Walker, Jr. | |
| 4,074,509 A | 2/1978 | Miles | |
| 4,148,598 A | 4/1979 | Colosimo et al. | |
| 4,180,889 A | 1/1980 | Joffe | |
| 4,182,003 A | 1/1980 | Lamartino et al. | |
| 4,272,864 A | 6/1981 | Holly | |
| 4,293,979 A | 10/1981 | Colosimo et al. | |
| 4,298,326 A | 11/1981 | Orlowski | |
| 4,597,134 A | 7/1986 | Wagner | |
| 4,635,538 A | 1/1987 | Polster | |
| 4,765,029 A | 8/1988 | Rogan | |
| 4,768,941 A | 9/1988 | Wagner | |
| 4,881,300 A * | 11/1989 | Chiodini | 425/557 |
| 5,030,164 A | 7/1991 | Wagner | |
| 5,112,634 A | 5/1992 | Swearingen | |
| 5,145,454 A | 9/1992 | Sandberg et al. | |
| 5,198,237 A | 3/1993 | Colosimo et al. | |
| D369,948 S | 5/1996 | Tobiasz | |
| 5,795,610 A * | 8/1998 | London | 426/512 |
| 6,386,854 B1 | 5/2002 | Guss | |

* cited by examiner

*Primary Examiner*—Donald Heckenberg
(74) *Attorney, Agent, or Firm*—Tarolli, Sundheim, Covell & Tummino LLP

(57) ABSTRACT

A patty forming apparatus (10) is connectable with an output portion (30) of a food processor (14). The apparatus (10) includes a housing (60) connectable with the output portion (30) of the food processor (14). A mold plate (100) is arranged for movement in the housing (60). The mold plate (100) includes at least a first mold portion (120). The mold plate (100) is movable to a first position in the housing (60) for receiving a food product (26) in the first mold portion (120) from the food processor (14). The mold plate (100) is movable to a second position in the housing (60) for removal of the food product (26) from the first mold portion (120).

20 Claims, 4 Drawing Sheets

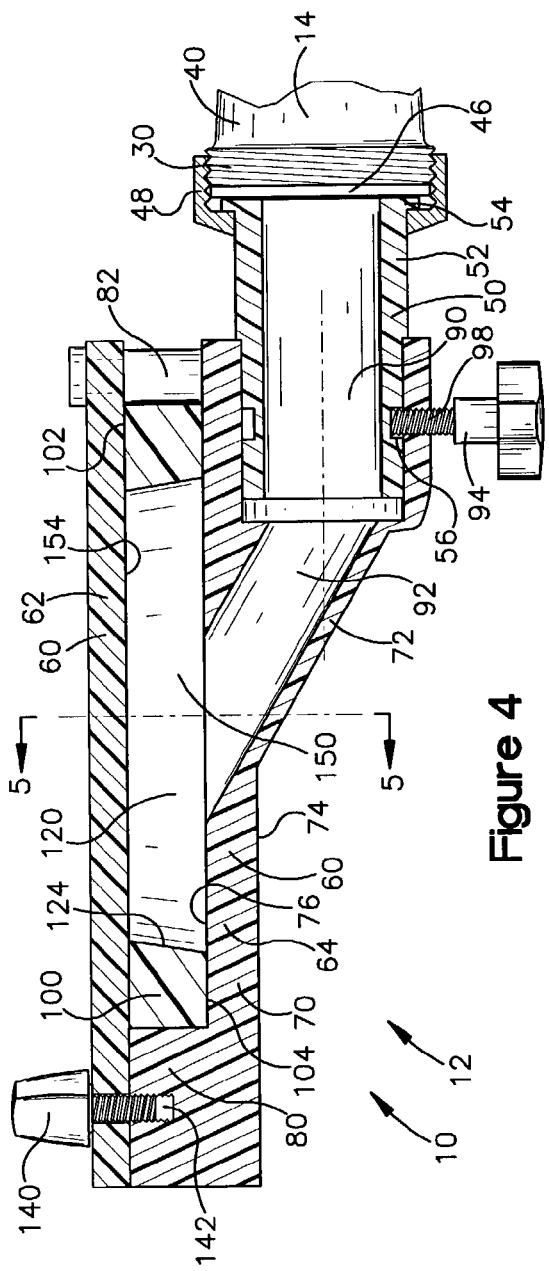
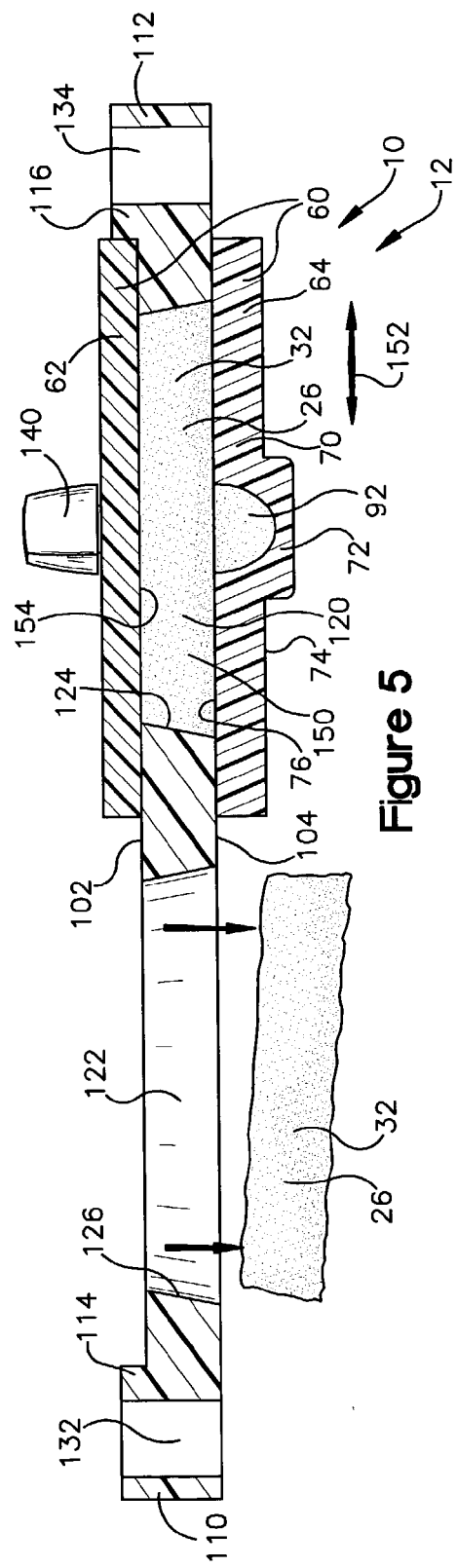

APPARATUS FOR MAKING PATTIES

FIELD OF THE INVENTION

The present invention relates to a food processing apparatus for making patties by molding or pressing a ground food product into a desired shape.

BACKGROUND OF THE INVENTION

Devices for molding food products into desired shapes are generally known. Among these devices are mold devices for processing a ground meat, such as ground beef, into a patty. In a home setting, the known mold devices are typically small units that include a single mold cavity. These residential mold devices are manually loaded with ground meat and operated manually to press or otherwise force the ground meat to conform with the mold cavity and produce a patty.

In a commercial or industrial setting, the known mold devices are large units that may include multiple mold cavities. These mold devices are loaded or fed a large volume of ground meat which is fed into the mold cavity or cavities automatically to produce the patties. These commercial and/or industrial mold devices may also be fit with meat grinding equipment so that the mold device may be fed with meat that has not been pre-ground. The patties are typically placed on a conveyor or other similar device to automatically discharge the patties from the mold device. These mold devices are capable of producing pressed patties in large volumes suited for commercial/industrial purposes. These mold devices may further be fit with equipment for packaging the patties as they are produced.

SUMMARY OF THE INVENTION

According to one aspect of the invention, the present invention relates to a patty forming apparatus connectable with an output portion of a food processor. The apparatus includes a housing connectable with the output portion of the food processor. A mold plate is arranged for movement in the housing. The mold plate includes at least a first mold portion. The mold plate is movable to a first position in the housing for receiving a food product in the first mold portion from the food processor. The mold plate is movable to a second position in the housing for removal of the food product from the first mold portion.

According to another aspect of the present invention, an apparatus is connectable with a meat grinder. The meat grinder has a discharge portion that includes a die plate and a collar for securing the die plate in the discharge portion. The apparatus includes means for forming a patty with ground meat discharged from the meat grinder. The apparatus also includes means for connecting the patty forming means with the meat grinder. The connecting means includes a flange portion adapted to be received in the discharge portion of the meat grinder adjacent the die plate. The flange portion is secured to the discharge portion by the collar to connect the patty forming means to the meat grinder.

According to still another aspect of the present invention, a patty forming apparatus includes a housing with a passage and a mold plate arranged for movement in the passage. The mold plate includes a first mold portion and a second mold portion. The mold plate is movable to a first position in the passage for receiving a food product in the first mold portion. The mold plate is movable to a second position in the housing for receiving a food product in the second mold portion.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIG. 4 is a sectional view of a portion of the apparatus taken generally along line 4—4 in FIG. 2 showing the portion in an assembled condition; and FIG. 5 is a sectional view of a portion of the apparatus taken generally along line 5—5 in FIG. 4.

DETAILED DESCRIPTION OF THE INVENTION

Figure 1:
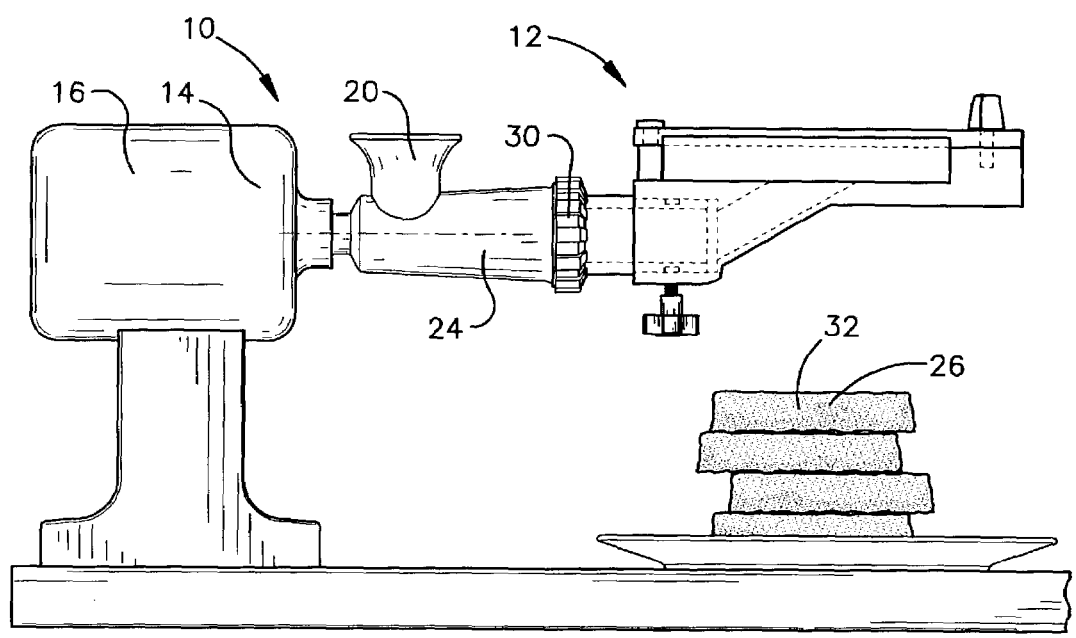
FIG. 1 is a schematic illustration of an apparatus for molding patties, according to an exemplary embodiment of the present invention.

Referring to FIG. 1, the present invention relates to an apparatus 10 for processing a food product into a predetermined form. According to the embodiment of FIGS. 1–5, the apparatus 10 comprises a mold apparatus 12 for receiving ground meat from a food processing device 14. In the example embodiment, the food processing device 14 is a meat grinder.

The meat grinder 14 includes an intake portion 20 for receiving meat (not shown), such as beef, or any other food product for which grinding is desired. The meat grinder 14 also includes a grinding portion 24 that minces or grinds the meat to produce a ground meat product 26. The meat grinder 14 further includes a discharge portion 30 that directs the ground meat product out of the meat grinder. In the example embodiment, the meat grinder 14 is an electric meat grinder powered by an electric motor 16. The meat grinder 14 could, however, be powered manually via a crank handle (not shown).

The mold apparatus 12 is connected with the discharge portion 30 of the meat grinder 14. The mold apparatus 12 is operative to receive the ground meat product 26 and mold or otherwise form the ground meat product into patties 32.

Figure 2:
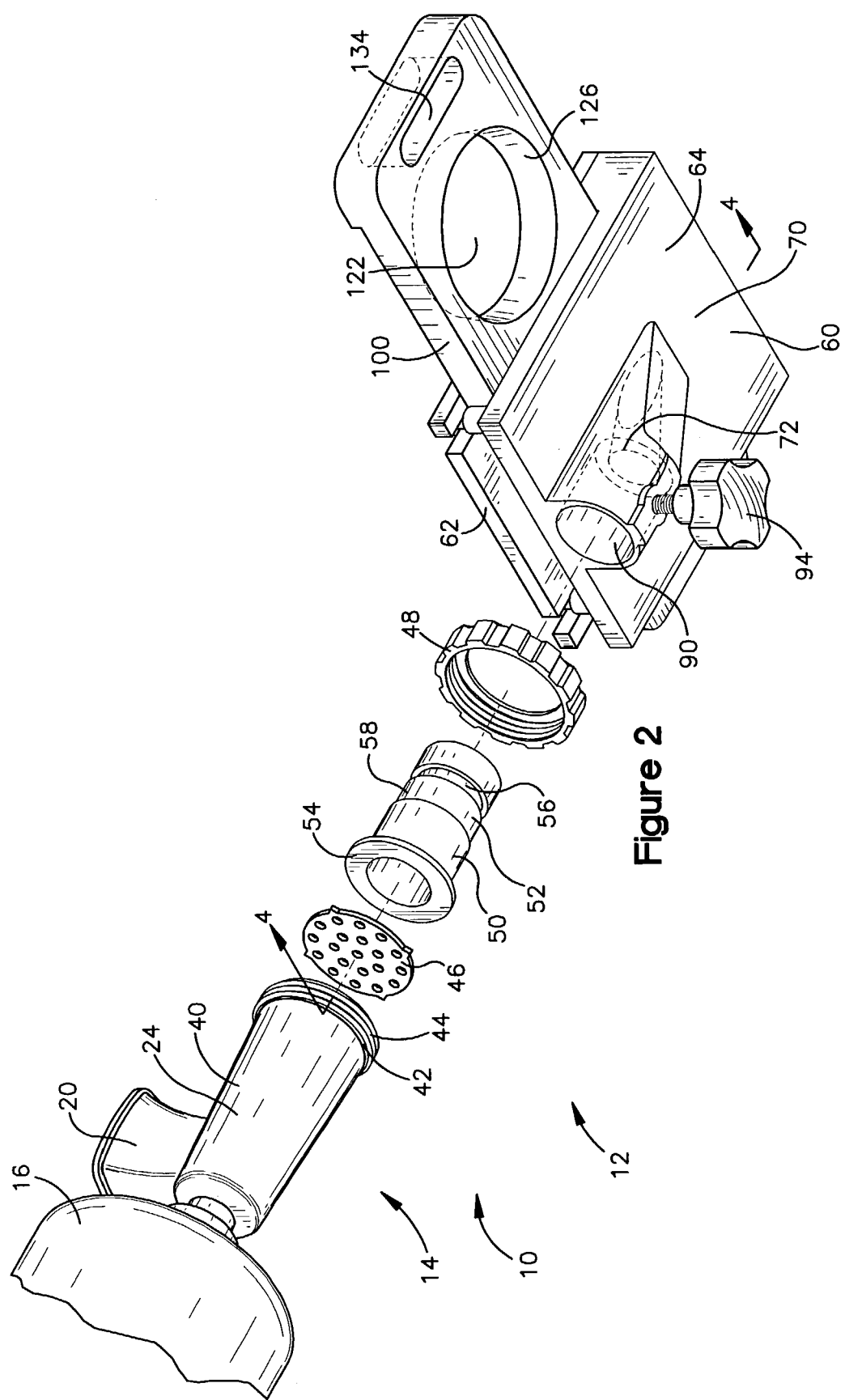
FIG. 2 is an exploded perspective view of a portion of the apparatus of FIG. 1.

Referring to FIG. 2, the meat grinder 14 may have a construction similar or identical to that of known meat grinders. The meat grinder 14 includes a housing portion 40 that supports the components (not shown) that help make-up the grinding portion 24. An end portion 42 of the housing 40 helps make-up the discharge portion 30 of the meat grinder 14. The end portion 42 includes screw threads 44 on an outer surface of the housing 40. The meat grinder 14 further includes a die plate 46, insertable into the discharge portion 30 of the housing 40. The meat grinder 14 also includes a threaded collar 48 that may be placed over the end portion 42 of the housing 40 and screwed onto the threads 44 to secure the die plate 46 in the discharge portion 30 of the housing.

The mold apparatus 12 includes a sleeve 50 that is connectable with the discharge portion 30 of the meat grinder 14. The sleeve 50 includes a conduit portion 52 and a flange portion 54. As shown in FIG. 2, the conduit portion 52 may have a generally cylindrical configuration. The conduit portion 52 may also include an annular recess 56 that extends into an outer surface 58 of the conduit portion around at least a portion of its circumference. The flange portion 54 may have a generally flat, ring-shaped configuration and extend transverse or perpendicular to the outer surface 58 of the conduit portion 52 at an end of the conduit portion.

The flange portion 54 of the sleeve 50 is insertable into the discharge portion 30 of the meat grinder 14 adjacent the die plate 46. The collar 48 may be placed over the conduit portion 42 of the sleeve 50 and over the end portion 42 of the housing 40. The collar 48 may then be screwed onto the threads 44 to secure the sleeve 50 and die plate 46 to the discharge portion 30 of the housing 40. The flange portion 54 is thus clamped between the die plate 46 and the collar 48. An assembled condition of the housing 40, die plate 46, and sleeve 50 is illustrated in FIG. 4.

Referring to FIGS. 2–5, the mold apparatus 12 includes a housing 60 and a mold plate 100. The housing 60 includes a top plate 62 and a bottom plate 64 that are connectable with each other. The top plate 62 may be constructed of a translucent material, such as a clear plastic material. The top plate 62 may include means for helping to connect the top plate to the bottom plate 64. In the illustrated embodiment, the top plate 62 includes a pair of slots 66 and an aperture 68 (see FIG. 3) for helping to connect the top plate with the bottom plate 64.

The bottom plate 64 may have a molded (e.g., injection molded) plastic construction. The bottom plate 64 includes a generally planar base portion 70 and a sleeve receiving portion 72 that projects from a lower surface 74 of the base portion. The base portion 70 has a thickened end wall portion 80 that projects from an upper surface 76 of the base portion, opposite the lower surface 74. The bottom plate 64 also may include means for helping to connect the top plate 62 with the bottom plate. In the illustrated embodiment, the bottom plate 64 includes a pair of posts 82 for helping to facilitate this connection.

The sleeve receiving portion 72 includes a sleeve receiving aperture 90 adapted to receive the conduit portion 52 of the sleeve 50 (see FIG. 2). In the embodiment of FIGS. 1–5, the sleeve receiving portion 72 comprises a cylindrical opening or sleeve that forms an injection passage 92. The injection passage 92 extends from the sleeve receiving aperture 90 through the base portion 70. The injection passage 92 provides fluid communication between the sleeve receiving portion 72 and the upper surface 76 of the base portion 70.

The mold apparatus 12 may also include means, such as a thumb screw 94 for helping to secure the sleeve 50 in the sleeve receiving portion 72. The thumb screw 94 includes a knob 96 and a threaded shaft 98. The shaft 98 is threaded through the cylindrical wall of the sleeve receiving portion 72. The shaft 98 is thus extendable into the injection passage 92 by rotating the thumb screw 94 via the knob 96.

Figure 3:
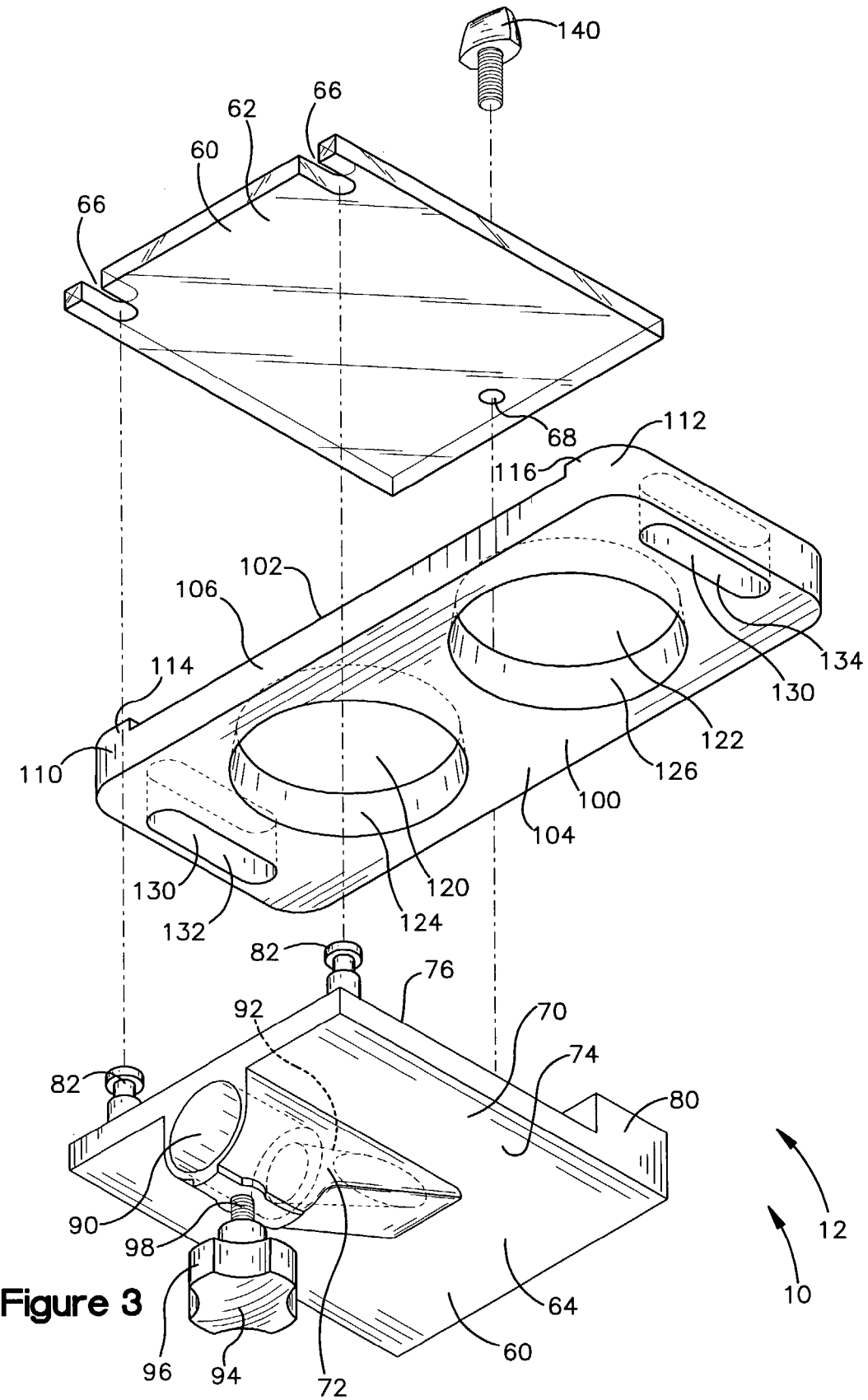
FIG. 3 is an exploded perspective view of another portion of the apparatus of FIG. 1.

The mold plate 100 may have a generally planar configuration with an upper surface 102 and an opposite lower surface 104, as shown in FIG. 3. The mold plate 100 includes a central portion 106 and opposite first and second end portions 110 and 112, respectively. The central portion 106 has a first thickness and the end portions 110 and 112 have a second thickness, greater than the first thickness. The increased thickness of the first and second end portions 110 and 112 projects from the upper surface 102 of the mold plate 100 to form first and second end stops 114 and 116 at opposite ends of the central portion 106 of the mold plate. The central portion 106 and the first and second end portions 110 and 112 are thus coplanar along the lower surface 104 of the mold plate 100.

The mold plate 100 includes first and second mold portions 120 and 122 that extend through the central portion 106 of the mold plate from the upper surface 102 to the lower surface 104. The first and second mold portions 120 and 122 comprise generally cylindrical apertures configured to provide a patty having a desired size and shape. The size and/or shape of the first and second mold portions 120 and 122 could be varied in order to produce a patty having any desired size and shape.

As best shown in FIGS. 4 and 5, the first and second mold portions 120 and 122 are formed by respective tapered side walls 124 and 126 that extend from the upper surface 102 of the mold plate 100 to the lower surface 104 of the mold plate. The side walls 124 and 126 are tapered from a narrowed diameter adjacent the upper surface 102 to a widened diameter adjacent the lower surface 104. The side walls 124 and 126 thus have a generally frustoconical configuration with a first diameter adjacent the upper surface 102 of the mold plate 100 and a second diameter, larger than the first diameter, adjacent the lower surface 104 of the mold plate.

The mold plate 100 (FIG. 3) also includes apertures 130 that form handles at opposite ends of the mold plate 100. A first handle 132 extends through the first end portion 110 of the mold plate 100. A second handle 134 extends through the second end portion 112 of the mold plate 100.

Assembly of the mold apparatus 12 is indicated generally by the dot-dashed lines in FIG. 3. To assemble the mold apparatus 12, the mold plate 100 is positioned with the lower surface 104 engaging the upper surface 76 of the bottom plate 64 between the end wall portion 80 and the posts 82. The top plate 62 is then placed overlying the upper surface 102 of the mold plate 100. The top plate 62 is maneuvered so that narrowed portions of the posts 82 are received in the slots 66. Fastening means, such as a thumb screw 140 is then inserted through the aperture 68 in the top plate 62 and into a fastener receiving aperture 142 (see FIG. 4). The thumb screw 140 is then tightened to connect the top plate 62 with the bottom plate 64. The top plate 62, when connected with the bottom plate 64, form the housing 60, which supports the mold plate 100.

The assembled condition of the mold apparatus 14 is illustrated in FIGS. 4 and 5. In the assembled condition, the mold plate 100 is supported in a passage 150 of the housing 60. The passage 150 is bounded by a lower surface 154 of the top plate 62, the upper surface 76 of the bottom plate 64, the end wall portion 80, and the posts 82. The mold plate is movable in the passage 150 in opposite directions indicated by the arrows identified at 152 in FIG. 5. The first and second end stops 114 and 116 come into engagement with opposite edges of the top plate 62 to limit movement of the mold plate 100 in the opposite directions 152.

The first end stop 114 engages an edge of the top plate 62 when the mold plate 100 is in a first position. The first position is illustrated in FIGS. 2, 4, and 5. When the mold plate 100 is in the first position, the first mold portion 120 is positioned in the passage 150. A first mold chamber is thus defined by the side wall 124 of the first mold portion 120, the top surface 76 of the bottom plate 64 and a lower surface 156 of the top plate 62. When the mold plate 100 is in the first position, the second mold portion 122 is positioned out of communication from the injection passage 92. In the example of FIG. 2, the second mold portion 122 is located outside the passage 150 and outside the housing 60.

The second end stop 116 engages an edge of the top plate 62 when the mold plate 100 is in a second position. When the mold plate 100 is in the second position, the second mold portion 122 is positioned in the passage 150. A second mold chamber is thus defined by the side wall 126 of the second mold portion 122, the top surface 76 of the bottom plate 64 and a lower surface 156 of the top plate 62. When the mold plate 100 is in the second position, the second mold chamber 122 is in fluid communication with the injection passage 92. The first mold portion 120 is positioned outside the passage 150 and outside the housing 60.

FIGS. 1, 4, and 5 illustrate the apparatus 10 in the assembled condition. In the assembled condition, the mold apparatus 12, assembled as described above, is operatively connected to the meat grinder 14. The sleeve 50 is connected to the discharge portion 30 of the meat grinder 14 via the collar 48. The conduit portion 52 of the sleeve 50 is inserted into the injection passage 92 through the sleeve receiving aperture 90. The thumbscrew 94 of the sleeve receiving portion 72 is operated such that the shaft 98 engages the annular recess 56 of the sleeve 50. This connects the sleeve 50 to the sleeve receiving portion 72. The mold apparatus 12 is thus locked onto the sleeve 50 and to the meat grinder 14 via the thumbscrew 94. Those skilled in the art will appreciate that other means (e.g., snap fittings, friction fittings, clamps, etc.) also could be used to secure the mold apparatus 12 to the grinder 14.

Once the apparatus 10 is in the assembled condition, the meat grinder 14 is turned on or otherwise activated. The mold plate 100 is positioned in the passage 150 manually to place the mold plate in one of the first or second positions. As a result, one of the first and second mold portions 120 and 122 is positioned around the location where the injection passage 92 passes through the bottom plate 64. The other of the first and second mold portions 120 and 122 is positioned outside the passage 150. In FIGS. 4 and 5, the mold plate 100 is in the first position, i.e., the first mold portion 120 is positioned in the passage 150 of the housing 60 and the second mold portion 122 is positioned outside the passage and the housing. The first mold portion 120 thus helps form a mold chamber in the passage 150.

Raw meat is fed into the grinder 14 via the receptacle 20. The meat is ground in the grinding portion 24 and ground meat 26 is discharged through the discharge portion 30 into the sleeve 50. The ground meat 26 is forced through the sleeve 50 and through the injection passage 92 into the first mold portion 120 to fill the mold portion. As shown in FIG. 5, patties 32 formed in the second mold portion 122 may be removed while the first mold portion 120 is filled. Once the ground meat 26 fills the first mold portion 120, the mold plate 100 is moved manually to the right as viewed in FIG. 5 to the second position, so that the first mold portion 120 exits the passage 150 and the patty 32 can be removed. When this happens, the second mold portion 122 moves into the passage 150 and begins filling with ground meat 26. This process may be repeated, filling one of the first and second mold portions 120 and 122 with ground meat 26 while removing a patty 32 from the other of the mold portions. This allows the meat grinder 14 to operate continuously without having to be stopped between patties.

The mold apparatus 12 of the present invention has several features that facilitate ease of use and convenience. The top plate 62, being constructed of a translucent material, allows the mold chambers formed by the first and second mold portions 120 and 122 to be viewed while positioned in the passage 150. This permits a user to monitor filling the first and second mold portions 120 and 122 so that the mold plate 100 may be moved at the appropriate time to allow removal of a patty 32. Also, the side walls 124 and 126 of the first and second mold portions 120 and 122, having a tapered configuration, facilitate easy removal of the patties 32 from the mold portions.

Furthermore, the mold plate 100 can be constructed such that the upper surface 102 and lower surface 104 of the central portion 106 are generally smooth surfaces. The housing 60 of the mold apparatus 12 is constructed such that the top and bottom plates 62 and 64 are also generally smooth and form a relatively close fit with the upper and lower surfaces 102 and 104 when the mold plate 100 is positioned in the passage 150. This helps prevent the ground meat 26 from escaping the first and second mold portions 120 and 122 and becoming lodged or otherwise displaced between the upper surface 102 and the top plate 62 or between the lower surface 104 and the bottom plate 64.

From the above description of the invention, those skilled in the art will perceive improvements, changes and modifications in the invention. For example, in the example embodiment of FIGS. 1–5, the mold plate is arranged for sliding movement in the housing to effectuate the formation/removal of patties in the mold portions. Those skilled in the art will appreciate that the mold plate may be arranged for alternative types of movement in or relative to the housing. For example, the mold plate may be arranged for rotary or pivotal movement in or relative to the housing. Also, although the mold plate of the example embodiment includes two mold portions, it will be appreciated that the mold plate may include a single mold portion or more than two mold portions. Furthermore, the apparatus could be arranged so that the ground food is fed into the first and second mold portions through the top plate instead of the bottom plate. Such improvements, changes and modifications within the skill of the art are intended to be covered by the appended claims.

I claim:

1. A patty forming apparatus connectable with an output portion of a food processor, said apparatus comprising:
   a housing connectable with the output portion of the food processor; and
   a mold plate arranged for movement in said housing, said mold plate including at least a first mold portion;
   said mold plate being movable to a first position in said housing for receiving a food product in said first mold portion from the food processor, said mold plate being movable to a second position in said housing for removal of said food product from said first mold portion, the first mold portion comprising a first side wall having a tapered configuration for facilitating removal of a patty molded therein.

2. The apparatus recited in claim 1, wherein said mold plate includes a second mold portion, said second mold portion receiving a food product from the food processor when said mold plate is in said second position, said second mold portion being positioned for removal of said food product from said second mold portion when said mold plate is in said first position.

3. The apparatus recited in claim 2, wherein said housing includes a top plate and a bottom plate, said top and bottom plates being spaced from each other to define a passage, said mold plate being supported in said passage and movable to said first and second positions in said passage.

4. The apparatus recited in claim 3, further comprising a conduit connectable with the output portion of the food processor, said conduit providing fluid communication between the output portion of the food processor and said passage, said first mold portion being positioned between said top and bottom plates and in fluid communication with the output portion of the food processor via said conduit when said mold plate is in said first position, said second mold portion being positioned between said top and bottom plates and in fluid communication with the output portion of the food processor via said conduit when said mold plate is in said second position.

5. The apparatus recited in claim 3, wherein said mold plate has an upper surface positioned adjacent said top plate of said housing and an opposite lower surface positioned adjacent said bottom plate of said housing, said first side wall extending through said mold plate from said upper surface to said lower surface, said second mold portion comprising a second side wall extending through said mold plate from said upper surface to said lower surface.

6. The apparatus recited in claim 5, wherein said upper surface of said mold plate is in sliding engagement with said top plate of said housing and said lower surface of said mold plate is in sliding engagement with said bottom plate of said housing.

7. The apparatus recited in claim 5, wherein said first side wall of said first mold portion extends from adjacent said top plate to adjacent said bottom plate forming a first mold chamber bounded by said first side wall, said top plate, and said bottom plate when said mold plate is in said first position, and wherein said second side wall of said second mold portion extends from adjacent said top plate to adjacent said bottom plate forming a second mold chamber bounded by said second side wall, said top plate, and said bottom plate when said mold plate is in said second position.

8. The apparatus recited in claim 5, wherein said second side wall has a tapered configuration for helping to facilitate removal of a patty of food product molded therein.

9. The apparatus recited in claim 5, wherein said first and second side walls each have a frustoconical configuration, said first and second side walls having a first diameter adjacent said upper surface of said mold plate and a second diameter larger than said first diameter adjacent said lower surface of said mold plate.

10. The apparatus recited in claim 5, wherein said first and second side walls each have a generally cylindrical configuration.

11. The apparatus recited in claim 3, wherein said top plate is constructed of a substantially translucent material which permits viewing inside said passage.

12. The apparatus recited in claim 1, wherein said mold plate is slidable in said housing between said first and second positions.

13. The apparatus recited in claim 1, wherein said mold plate comprises at least one handle for manually moving said mold plate between said first and second positions.

14. The apparatus recited in claim 2, wherein said second mold portion is positioned outside said housing while said mold plate is in said first position and said first mold portion is positioned outside said housing while said mold plate is in said second position.

15. The apparatus recited in claim 1, wherein the food processor comprises a grinder having a discharge portion comprising a die plate and a collar for securing the die plate in the discharge portion, said apparatus further comprising a sleeve having a first end connectable with said housing and an opposite second end adapted for connection with the discharge portion of the grinder.

16. The apparatus recited in claim 15, wherein said sleeve comprises a flange adapted to be received in the discharge portion adjacent the die plate and secured to the discharge portion by the collar.

17. An apparatus connectable with a meat grinder, the meat grinder having a discharge portion that includes a die plate and a collar for securing the die plate in the discharge portion, said apparatus comprising:

means for forming a patty with ground meat discharged from the meat grinder; and means for connecting said patty forming means with the meat grinder, said connecting means comprising a flange portion adapted to be received in the discharge portion of the meat grinder adjacent the die plate and secured to the discharge portion by the collar to connect said patty forming means to the meat grinder.

18. The apparatus recited in claim 17, wherein said flange portion is adapted to be clamped between the die plate and the collar to connect said patty forming means to the meat grinder.

19. A patty forming apparatus comprising:

a housing including a passage; and a mold plate arranged for movement in said passage, said mold plate including a first mold portion and a second mold portion, each of said first and second mold portions comprising a tapered side wall for facilitating removal of patties molded therein;

said mold plate being movable to a first position in said passage for receiving a food product in said first mold portion, said mold plate being movable to a second position in said housing for receiving a food product in said second mold portion.

20. The apparatus recited in claim 19, wherein said second mold portion is positioned outside said housing while said mold plate is in said first position, and said first mold portion is positioned outside said housing while said mold plate is in said second position.

* * * * *